Nov. 3, 1936.  A. C. MATHER  2,059,737
COMBINED SIDE AND PLATFORM FOR CARS
Filed Dec. 15, 1932
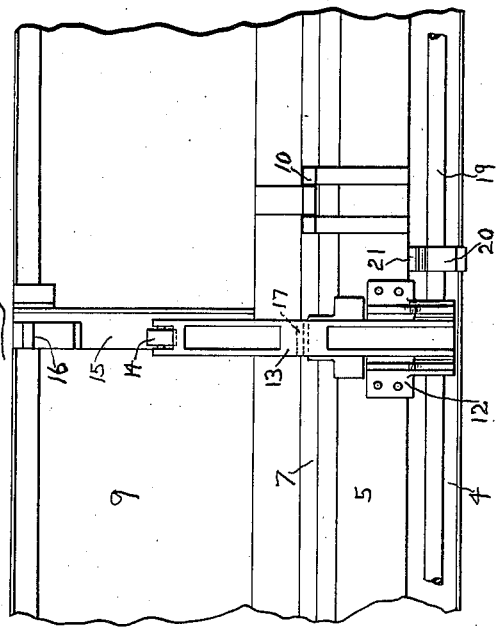
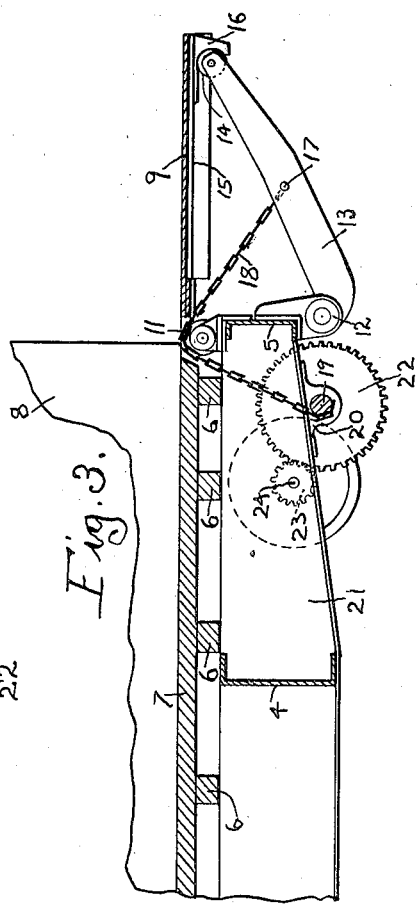
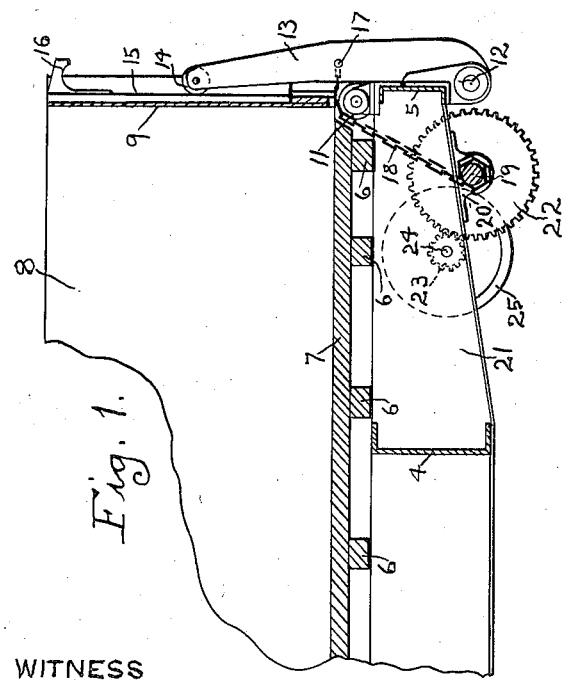
WITNESS
Richard J. Jacker
INVENTOR
Alonzo C. Mather Patented Nov. 3, 1936

2,059,737

UNITED STATES PATENT OFFICE 2,059,737

COMBINED SIDE AND PLATFORM
FOR CARS

Alonzo C. Mather, Chicago, Ill.

Application December 15, 1932, Serial No. 647,380

4 Claims. (Cl. 105—258)

My invention relates to railroad cars and particularly to gondola cars and the construction of the sides of the car whereby the sides of the car are used as a platform to load the car and unload the car. My invention provides means on a railroad car whereby freight can be transferred to or from a platform or a motor truck, be the freight in cartons or not. The objects of my invention are to enable loading the car or unloading the car at any point along its travel; to apply the mechanism embodying my invention to any gondola car now constructed; to convert the present side of the car into a platform; to provide mechanism which will support the side in a lowered position on a level with the floor of the car; to provide manual operated means for lowering and raising the sides of the car; to provide mechanism which is easily and rapidly operated and other objects to become apparent from the description to follow.

In the shipment of freight by railroad especially heavy freight it is found very inconvenient to load the freight at the shipping point and to unload the freight at its destination because there is no platform provided for at either point but with the use of my invention the side of the car can be converted into a platform and held rigid in a position to be in the same horizontal plane with the floor of the car and at a height slightly above the floor of a truck backed-up to the car when the truck wheels are substantially on a level with the rail supporting the gondola car.

To describe my invention so that others versed in the art to which it pertains can make and use the same I have illustrated it on the accompanying sheet of drawing in which: Figure 1 is a cross sectional view of a gondola car partly broken away showing my invention attached thereto; Fig. 2 is a side elevation of the same, and Fig. 3 is a cross sectional view similar to Fig. 1, but showing the side lowered to form a platform.

Similar reference figures refer to similar parts throughout the several views.

In the drawing the center sill is shown at 4, the side sill at 5, the floor joist at 6, the floor at 7, the end of the car at 8 and the side of the car at 9. Both sides of the car are made alike, I will therefor describe the one side only. The lower edge of the side 9 is hinged to the side sill at 10, a plurality of such hinges are provided but only one is shown in Figure 2. A plurality of idler pulleys are rigidly mounted on the upper side of the sill 5 and a similar number of pivot blocks 12 are rigidly mounted on the lower side of the sill 5. Each pivot block 12 has pivoted therein an arm 13 the free end of which has pivotally mounted thereon an anti-friction roller 14 which is arranged to travel on a plate 15 rigidly secured to the side 9, the top of the plate has rigidly secured thereto a stop 16 against which the roller 14 comes to stop as shown in Figure 3 when the side 9 is in a lowered position. Each arm 13 has a pin 17 located about midway its length to which is secured one end of a chain 18 which passes over the roller 11 and has its other end secured to a shaft 10 19 extending the entire length of the car and mounted in bearings 20 rigidly secured at the lower edges of the car body bolsters 21.

As seen in the drawing Fig. 1, shows the side up in its normal position and Fig. 3 shows the 15 side in its lowered position to be in the same horizontal plane as the floor 7 of the car. To move the side 9 about its hinges 10 from its up position as seen in Fig. 1, to its down position as seen in Fig. 3, it is only necessary to rotate the 20 shaft 19 sufficiently to unwind enough lengths of the chains 18 to allow the free ends of the arms 13 to swing down about their pivots to permit the rollers 14 to engage the stops 16. To return the side 9 from its down position to its 25 up position it will be necessary to rotate the shaft 19 in a reverse direction to wind up the chains 18 and swing the arms 13 on their pivots sufficiently to swing the side 9 to the vertical position shown in Fig. 1. To thusly rotate the 30 shaft 19 a large gear 22 is rigidly secured to one end of the shaft 19, and meshing with this large gear 22 is a small gear 23 pivoted at 24 and rigidly secured to the small gear 23 is a hand wheel 25, so that rotating the hand wheel 25 35 will rotate the shaft 19. The hand wheel is provided with the ordinary pawl and ratchet not shown.

I desire to be understood not to limit myself to the exact construction shown, and that the 40 size and arrangements of the parts may be changed without in the least departing from the scope of my invention.

Having thus fully described my invention what I claim as new and desire to secure by Letters 45 Patent of the United States is:

1. In a device of the class described, a car body provided with a vertical side hinged at its lower edge to said body, an arm hinged at its lower end to said body below the floor level and 50 substantially in the vertical plane of the hinged side and having its free upper end engaging said side, an idler pulley mounted below the car floor, a shaft pivotally mounted below the car floor, a large gear secured to said shaft, a small gear 55 meshing with said large gear, a hand wheel rigidly connected to said small gear and a flexible element having one end connected to said shaft and the other end connected to said arm at a point spaced substantially longitudinally from said arm hinge, the intermediate portion of the flexible element passing over said idler pulley.

2. In a device of the class described, a car body having a horizontal floor, a vertical side wall hinged to said body adjacent the floor level to swing from a vertical position to a position substantially in alignment with the floor, an arm pivoted to said body below the level of the floor and substantially in the vertical plane of the hinged side, said arm resting with its free end against the outer face of the hinged side, a stop carried by the hinged side and engaged by the free end of the arm when the hinged side of the door is in its horizontally disposed position, a flexible member engaging said arm at a point spaced substantially longitudinally from said arm hinge, and means for drawing in or paying out the flexible member to swing the arm upon its pivot and dispose the hinged side in a desired position as established by the position of said arm.

3. In a device of the class described, comprising a car body provided with a floor and with a vertical side hinged to said body at its lower end adjacent the floor, an arm hinged at its lower end to said body below the floor level and having its free upper end engaging said side, said arm lying substantially in the vertical plane of the hinged side, a flexible element connected with said arm at a point spaced substantially longitudinally from said arm hinge and adapted to maintain the arm in a desired position, and means for drawing in or paying out said flexible element to dispose the arm and the vertical hinged side of the car body at a desired angular position.

4. In a device of the class described, comprising a car body provided with a floor and with a vertical side hinged to said body at its lower end adjacent the floor, an arm hinged at its lower end to said body below the floor level and having its free upper end engaging said side, said arm lying substantially in the vertical plane of the hinged side, a flexible element connected with said arm at a point spaced substantially longitudinally from said arm hinge and adapted to maintain the arm in a desired position, means for drawing in or paying out said flexible element to dispose the arm and the vertical hinged side of the car body at a desired angular position, and a stop carried by the vertical hinged side of the car and engaged by the free end of the arm when the hinged side is in its lowermost position whereby the weight of the hinged side of the car will be disposed as a thrust directly upon said arm.

ALONZO C. MATHER.